(12) United States Patent
Douglas et al.

(10) Patent No.: US 10,093,061 B2
(45) Date of Patent: Oct. 9, 2018

(54) TAGGED BUILD MATERIAL FOR THREE-DIMENSIONAL PRINTING

(71) Applicant: MakerBot Industries, LLC, Brooklyn, NY (US)

(72) Inventors: Ariel Douglas, Brooklyn, NY (US); Robert J. Steiner, Brooklyn, NY (US); Aric Lynn Jennings, Brooklyn, NY (US); William B. Buel, Sunnyvale, CA (US); Anthony D. Moschella, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 0 days.

(21) Appl. No.: 14/992,127

(22) Filed: Jan. 11, 2016

(65) Prior Publication Data

US 2016/0121550 A1    May 5, 2016

Related U.S. Application Data

(63) Continuation of application No. 14/064,974, filed on Oct. 28, 2013, now Pat. No. 9,233,504.

(Continued)

(51) Int. Cl.
*B29C 41/22* (2006.01)
*B29C 64/205* (2017.01)
(Continued)

(52) U.S. Cl.
CPC .......... *B29C 64/205* (2017.08); *B29C 47/025* (2013.01); *B29C 47/92* (2013.01); *B29C 64/106* (2017.08); *B29C 64/209* (2017.08); *B29C 64/386* (2017.08); *B29C 64/40* (2017.08); *B33Y 30/00* (2014.12); *B33Y 50/02* (2014.12); *B29C 47/0002* (2013.01); *B29C 47/0864* (2013.01); *B29C 47/0866* (2013.01); *B29C 2947/9258* (2013.01); *B29C 2947/92704* (2013.01); *B29K 2101/12* (2013.01); *B29K 2105/0067* (2013.01); *B33Y 10/00* (2014.12); *B33Y 40/00* (2014.12);
(Continued)

(58) Field of Classification Search
CPC .................... B29C 67/0055; B29K 2995/0073
USPC ........... 264/129, 176.1, 40.1, 40.7, 308, 113, 264/401, 497; 425/145, 150, 375, 112, 425/113, 174.4, 185, 186; 700/118, 119, 700/120; 226/8, 24, 26, 42, 43, 45
See application file for complete search history.

(56) References Cited

U.S. PATENT DOCUMENTS 6,022,207 A   2/2000 Dahlin et al.
6,505,926 B1  1/2003 Trafton et al.
(Continued)

OTHER PUBLICATIONS

"Cartridges and Filament Flow Errors", CubeX 3D Printing Blog. http://cubex3dprinting.blogspot.com/2013/07/cartridges-and-filament-flow-errors.html, Jul. 10, 2013, 6 Pages.
(Continued)

*Primary Examiner* — Joseph S Del Sole
*Assistant Examiner* — Thukhanh T Nguyen
(74) *Attorney, Agent, or Firm* — Strategic Patents, P.C.

(57) ABSTRACT

A supply of build material such as a spool or cartridge is instrumented with a data tag that includes information about the build material. A three-dimensional printer can read the information from the tag and determine how to use the build material during fabrication of a three-dimensional object.

15 Claims, 7 Drawing Sheets

Related U.S. Application Data

(60) Provisional application No. 61/719,874, filed on Oct. 29, 2012.

(51) Int. Cl.

| | | |
|---|---|---|
| *B29C 47/92* | (2006.01) | |
| *B29C 64/209* | (2017.01) | |
| *B29C 47/02* | (2006.01) | |
| *B33Y 30/00* | (2015.01) | |
| *B33Y 50/02* | (2015.01) | |
| *B29C 64/106* | (2017.01) | |
| *B29C 64/386* | (2017.01) | |
| *B29C 64/40* | (2017.01) | |
| *B33Y 80/00* | (2015.01) | |
| *B29C 47/00* | (2006.01) | |
| *B29C 47/08* | (2006.01) | |
| *B33Y 50/00* | (2015.01) | |
| *B33Y 10/00* | (2015.01) | |
| *B33Y 40/00* | (2015.01) | |
| *B33Y 70/00* | (2015.01) | |
| *B29K 101/12* | (2006.01) | |
| *B29K 105/00* | (2006.01) | |

(52) U.S. Cl.
CPC ............... *B33Y 50/00* (2014.12); *B33Y 70/00* (2014.12); *B33Y 80/00* (2014.12)

(56) References Cited

U.S. PATENT DOCUMENTS

| | | |
|---|---|---|
| 7,520,740 B2 | 4/2009 | Wahlstrom et al. |
| 7,621,733 B2 | 11/2009 | Reynolds et al. |
| 7,690,909 B2 | 4/2010 | Wahlstrom |
| 7,996,101 B2 | 8/2011 | Menchik et al. |
| 8,157,202 B2 | 4/2012 | Taatjes et al. |
| 8,222,908 B2 | 7/2012 | Paul et al. |
| 8,286,236 B2 | 10/2012 | Jung et al. |
| 2003/0217275 A1 | 11/2003 | Bentley et al. |
| 2006/0127153 A1* | 6/2006 | Menchik ............. B29C 67/0059 400/62 |
| 2010/0289627 A1* | 11/2010 | McAllister ........... G06Q 10/087 340/10.42 |
| 2011/0121476 A1* | 5/2011 | Batchelder .......... B29C 67/0055 264/40.1 |
| 2013/0161439 A1 | 6/2013 | Beery et al. |
| 2014/0117585 A1 | 5/2014 | Douglas et al. |
| 2016/0067927 A1* | 3/2016 | Voris .................... B29C 64/386 700/98 |

OTHER PUBLICATIONS

USPTO, "U.S. Appl. No. 14/064,974, Non-Final Office Action mailed Apr. 10, 2015", 10 pages.

USPTO, "U.S. Appl. No. 14/064,974, Notice of Allowance mailed Oct. 8, 2015", 7 pages.

\* cited by examiner

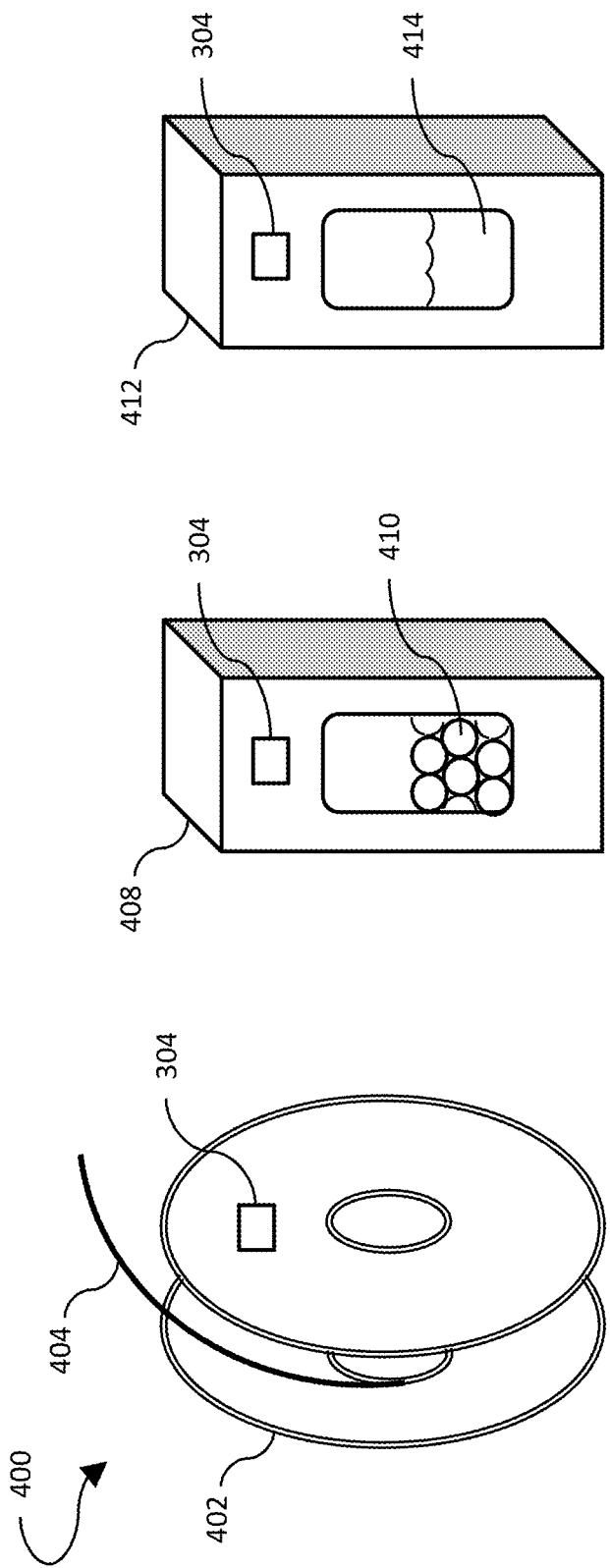

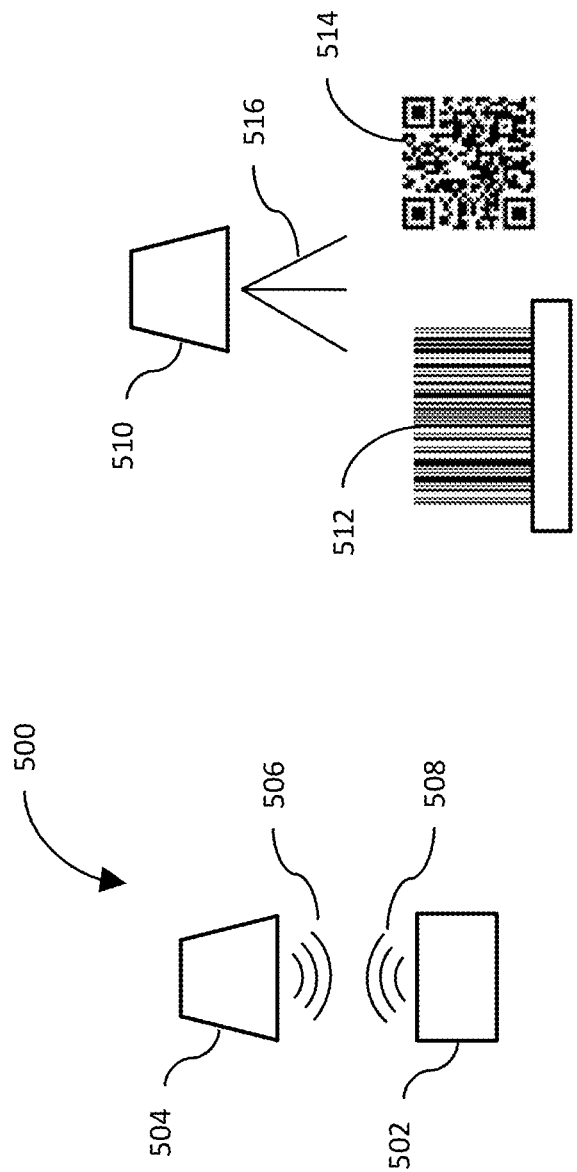

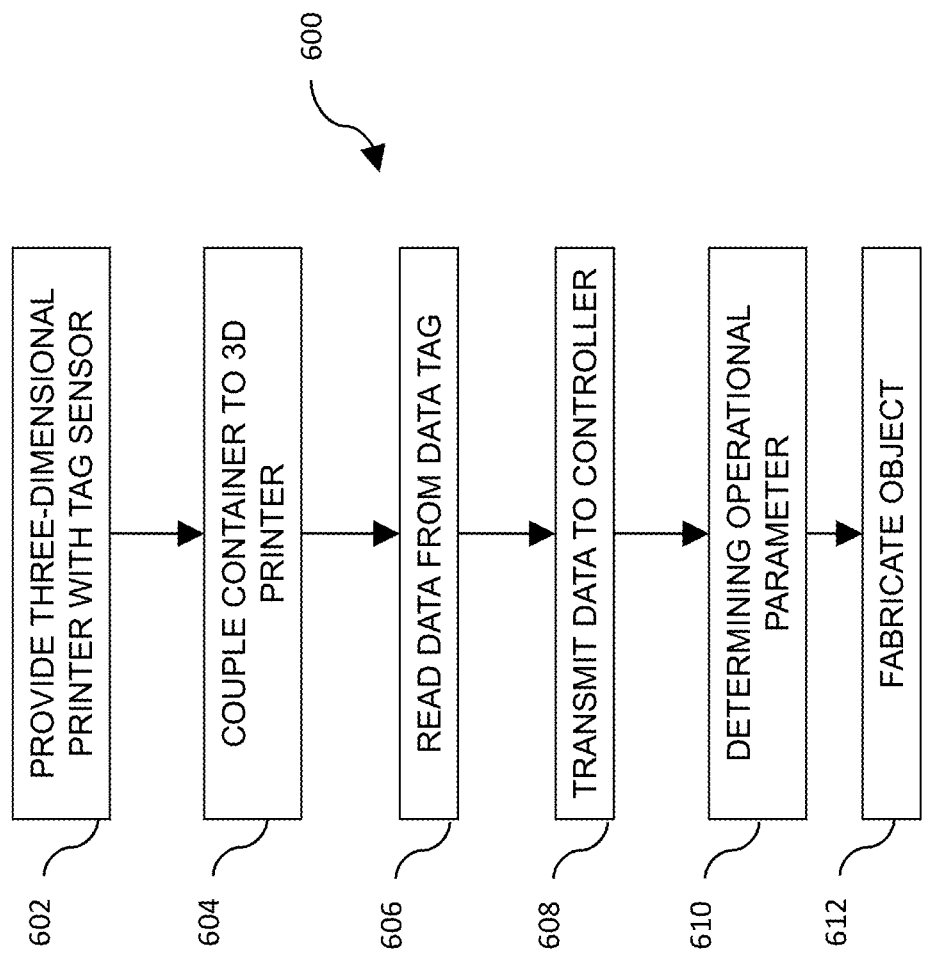

TAGGED BUILD MATERIAL FOR THREE-DIMENSIONAL PRINTING

RELATED APPLICATIONS

This application is a continuation of U.S. patent application Ser. No. 14/064,974 filed on Oct. 28, 2013, now U.S. Pat. No. 9,233,504, which claims the benefit of U.S. App. No. 61/719,874 filed on Oct. 29, 2012, where the entire content of each of the foregoing is hereby incorporated by reference.

BACKGROUND

In general, three-dimensional printers use build material of various type and configuration to print three-dimensional objects. In order to properly process the build material through the three-dimensional printer extruder for the fabrication of an object, the three-dimensional printer controller may need at least a basic set of characteristics of the build material to determine operation.

There remains a need for methods and systems for the automatic detection and acquiring of three-dimensional printer build material characteristics.

SUMMARY

A supply of build material such as a spool or cartridge is instrumented with a data tag that includes information about the build material. A three-dimensional printer can read the information from the tag and determine how to use the build material during fabrication of a three-dimensional object.

BRIEF DESCRIPTION OF THE FIGURES

The invention and the following detailed description of certain embodiments thereof may be understood by reference to the following figures:

FIGS. 4A-4C depict embodiments of build material supplies.

FIGS. 5A-5D depict embodiments of tag sensors and data tags.

FIG. 6 is a flowchart of a method for using a three-dimensional printer to read build material supply tag data and fabricate an object.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes three-dimensional printers using fused deposition modeling or similar techniques where a bead of material is extruded in a layered series of two dimensional patterns as "roads," "paths" or the like to form a three-dimensional object from a digital model. It will be understood, however, that numerous additive fabrication techniques are known in the art including without limitation multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer", "three-dimensional printer", "fabrication system", and so forth, unless a more specific meaning is explicitly provided or otherwise clear from the context.

In the following description, a variety of terms are used to describe containers for build material such as a container, a spool, a cartridge, and so forth. Unless a different meaning is explicitly provided or otherwise clear from the context, all such terms are intended to refer generally to a container or the like that holds a build material for use by a three-dimensional printer, without regard to whether the container encloses the build material and without regard to the manner in which the container provides the build material to the three-dimensional printer.

Figure 1:
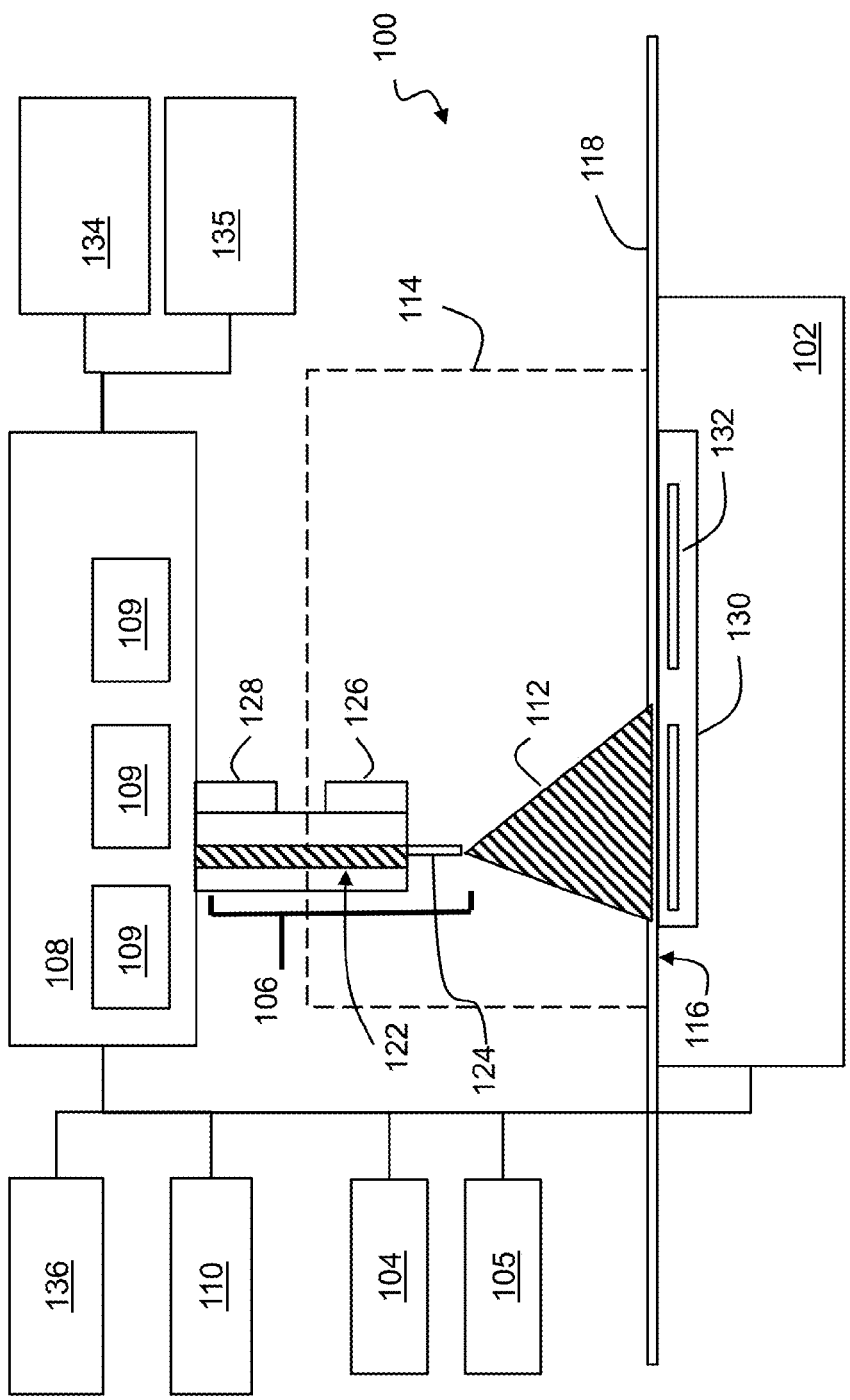
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling effect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 (also referred to as a heating element) to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods by a threaded nut so that the threaded rods can be rotated to provide z-axis positioning of the build platform 102 relative to the extruder 106. This arrangement may advantageously simplify design and improve accuracy by permitting an x-y positioning mechanism for the extruder 106 to be fixed relative to a build volume. Any such arrangement suitable for controllably positioning the extruder 106 within the working volume 114 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" or "processor" as used herein, unless a different meaning is explicitly provided or otherwise clear from the context.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102, the extruder 126, or any other system components. This may, for example, include a thermistor or the like embedded within or attached below the surface of the build platform 102. This may also or instead include an infrared detector or the like directed at the surface 116 of the build platform 102.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134 may also or instead include a heating element (instead of or in addition to the thermal element 130) to heat the working volume such as a radiant heater or forced hot air heater to maintain the object 112 at a fixed, elevated temperature throughout a build, or the other hardware 134 may include a cooling element to cool the working volume.

Figure 2:
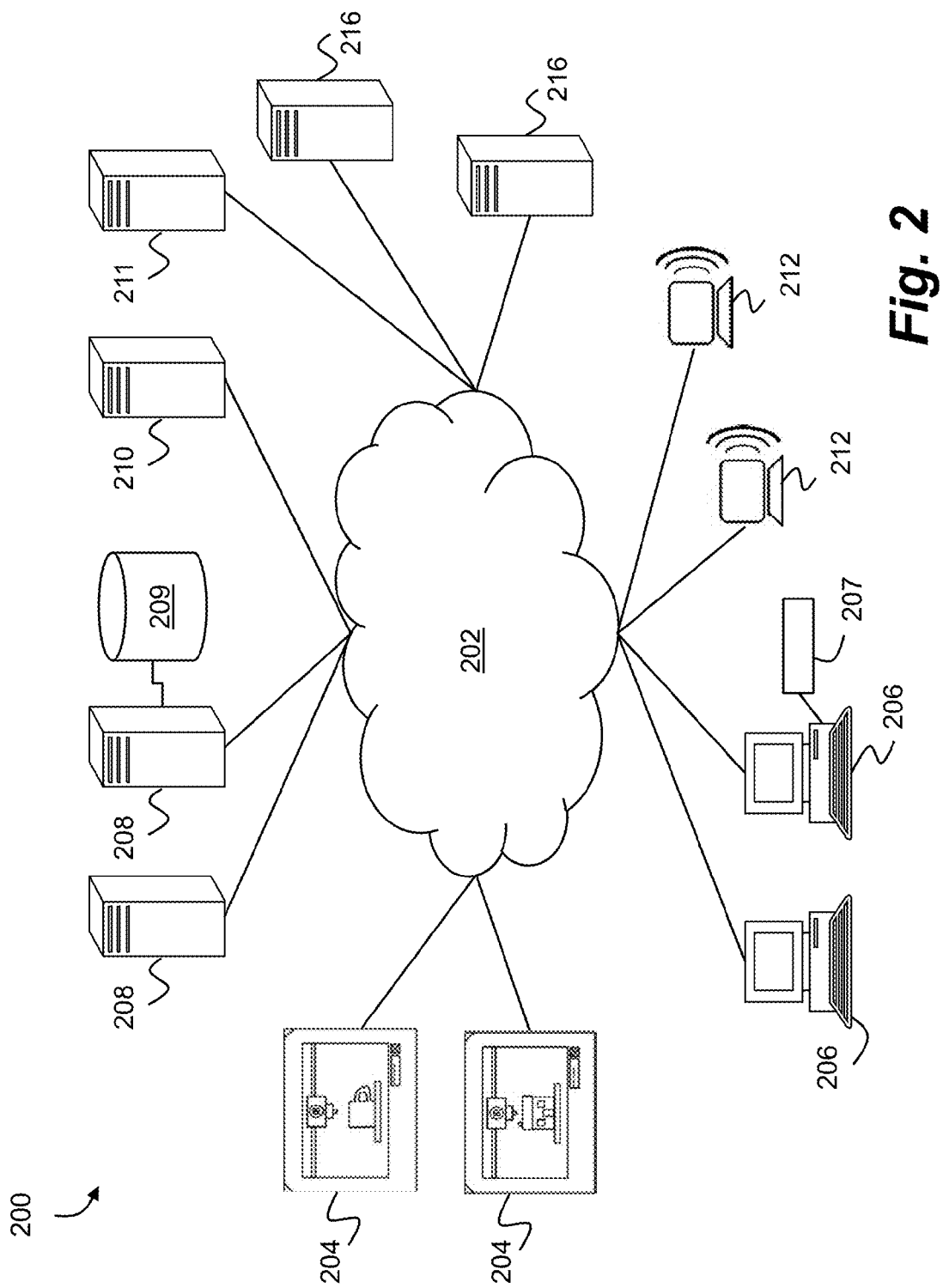
FIG. 2 depicts a networked three-dimensional printing environment.

FIG. 2 depicts a networked three-dimensional printing environment. In general, the environment 200 may include a data network 202 interconnecting a plurality of participating devices in a communicating relationship. The participating devices may, for example, include any number of three-dimensional printers 204 (also referred to interchangeably herein as "printers"), client devices 206, print servers 208, content sources 210, mobile devices 212, and other resources 216.

The data network 202 may be any network(s) or inter-network(s) suitable for communicating data and control information among participants in the environment 200. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMax-Advanced (IEEE 802.16m)) and/or other technologies, as well as any of a variety of corporate area or local area networks and other switches, routers, hubs, gateways, and the like that might be used to carry data among participants in the environment 200.

The three-dimensional printers 204 may be any computer-controlled devices for three-dimensional fabrication, including without limitation any of the three-dimensional printers or other fabrication or prototyping devices described above. In general, each such device may include a network interface comprising, e.g., a network interface card, which term is used broadly herein to include any hardware (along with software, firmware, or the like to control operation of same) suitable for establishing and maintaining wired and/or wireless communications. The network interface card may include without limitation wired Ethernet network interface cards ("NICs"), wireless 802.11 networking cards, wireless 802.11 USB devices, or other hardware for wireless local area networking. The network interface may also or instead include cellular network hardware, wide area wireless network hardware or any other hardware for centralized, ad hoc, peer-to-peer, or other radio communications that might be used to carry data. In another aspect, the network interface may include a serial or USB port to directly connect to a computing device such as a desktop computer that, in turn, provides more general network connectivity to the data network 202.

The printers 204 might be made to fabricate any object, practical or otherwise, that is amenable to fabrication according to each printer's capabilities. This may be a model of a house or a tea cup, as depicted, or any other object such as gears or other machine hardware, replications of scanned three-dimensional objects, or fanciful works of art.

Client devices 206 may be any devices within the environment 200 operated by users to initiate, manage, monitor, or otherwise interact with print jobs at the three-dimensional printers 204. This may include desktop computers, laptop computers, network computers, tablets, or any other computing device that can participate in the environment 200 as contemplated herein. Each client device 206 generally provides a user interface, which may include a graphical user interface, a text or command line interface, a voice-controlled interface, and/or a gesture-based interface to control operation of remote three-dimensional printers 204. The user interface may be maintained by a locally executing application on one of the client devices 206 that receives data and status information from, e.g., the printers 204 and print servers 208 concerning pending or executing print jobs. The user interface may create a suitable display on the client device 206 for user interaction. In other embodiments, the user interface may be remotely served and presented on one of the client devices 206, such as where a print server 208 or one of the three-dimensional printers 204 includes a web server that provides information through one or more web pages or the like that can be displayed within a web browser or similar client executing on one of the client devices 206. In one aspect, the user interface may include a voice controlled interface that receives spoken commands from a user and/or provides spoken feedback to the user.

A client device 206 may, for example include a removable memory device 207 such as a USB drive, memory stick, or the like, which may be used for example to transfer digital models of three-dimensional objects to printers 204.

The print servers 208 may include data storage, a network interface, and a processor and/or other processing circuitry. In the following description, where the functions or configuration of a print server 208 are described, this is intended to include corresponding functions or configuration (e.g., by programming) of a processor of the print server 208. In general, the print servers 208 (or processors thereof) may perform a variety of processing tasks related to management of networked printing. For example, the print servers 208 may manage print jobs received from one or more of the client devices 206, and provide related supporting functions such as content search and management. A print server 208 may also include a web server that provides web-based access by the client devices 206 to the capabilities of the print server 208. A print server 208 may also communicate periodically with three-dimensional printers 204 in order to obtain status information concerning, e.g., availability of printers and/or the status of particular print jobs, any of which may be subsequently presented to a user through the web server or any other suitable interface. A print server 208 may also maintain a list of available three-dimensional printers 204, and may automatically select one of the three-dimensional printers 204 for a user-submitted print job, or may permit a user to specify a single printer, or a group of preferred printers, for fabricating an object. Where the print server 208 selects the printer automatically, any number of criteria may be used such as geographical proximity, printing capabilities, current print queue, fees (if any) for use of a particular three-dimensional printer 204, and so forth. Where the user specifies criteria, this may similarly include any relevant aspects of three-dimensional printers 204, and may permit use of absolute criteria (e.g., filters) or preferences, which may be weighted preferences or unweighted preferences, any of which may be used by a print server 208 to allocate a print job to a suitable resource.

In one aspect, the print server 208 may be configured to support interactive voice control of one of the printers 204. For example, the print server 208 may be configured to receive a voice signal (e.g., in digitized audio form) from a microphone or other audio input of the printer 204, and to process the voice signal to extract relevant content such as a command for the printer. Where the command is recognized as a print command, the voice signal may be further processed to extract additional context or relevant details. For example, the voice signal may be processed to extract an object identifier that specifies an object for printing, e.g., by filename, file metadata, or semantic content. The voice signal may also be processed to extract a dimensional specification, such as a scale or absolute dimension for an object. The print server 208 may then generate suitable control signals for return to the printer 204 to cause the printer 204 to fabricate the object. Where an error or omission is detected, the print server 208 may return a request for clarification to the printer 204, which may render the request in spoken form through a speaker, or within a user interface of the printer 204 or an associated device.

Other user preferences may be usefully stored at the print server 208 to facilitate autonomous, unsupervised fabrication of content from content sources 210. For example, a print server 208 may store a user's preference on handling objects greater than a build volume of a printer. These preferences may control whether to resize the object, whether to break the object into multiple sub-objects for fabrication, and whether to transmit multiple sub-objects to a single printer or multiple printers. In addition, user preferences or requirements may be stored, such as multi-color printing capability, build material options and capabilities, and so forth. More generally, a print queue (which may be a printer-specific or user-specific queue, and which may be hosted at a printer 204, a server 208, or some combination of these) may be managed by a print server 208 according to one or more criteria from a remote user requesting a print job. The print server 208 may also store user preferences or criteria for filtering content, e.g., for automatic printing or other handling. While this is described below as a feature for autonomous operation of a printer (such as a printer that locally subscribes to a syndicated model source), any criteria that can be used to identify models of potential interest by explicit type (e.g., labeled in model metadata), implicit type (e.g., determined based on analysis of the model), source, and so forth, may be provided to the print server 208 and used to automatically direct new content to one or more user-specified ones of the three-dimensional printers 204.

In one aspect, the processor of the print server may be configured to store a plurality of print jobs submitted to the web server in a log and to provide an analysis of print activity based on the log. This may include any type of analysis that might be useful to participants in the environment 200. For example, the analysis may include tracking of the popularity of particular objects, or of particular content sources. The analysis may include tracking of which three-dimensional printers 204 are most popular or least popular, or related statistics such as the average backlog of pending print jobs at a number of the three-dimensional printers 204. The analysis may include success of a particular printer in fabricating a particular model or of a particular printer in completing print jobs generally. More generally, any statistics or data may be obtained, and any analysis may be performed, that might be useful to users (e.g., when requesting prints), content sources (e.g., when choosing new printable objects for publication), providers of fabrication resources (e.g., when setting fees), or network facilitators such as the print servers 208.

A print server 208 may also maintain a database 209 of content, along with an interface for users at client devices 206 to search the database 209 and request fabrication of objects in the database 209 using any of the three-dimensional printers 204. Thus in one aspect, a print server 208 (or any system including the print server 208) may include a database 209 of three-dimensional models, and the print server 208 may act as a server that provides a search engine for locating a particular three-dimensional model in the database 209. The search engine may be a text-based search engine using keyword text queries, plain language queries, and so forth. The search engine may also or instead include an image-based search engine configured to identify three-dimensional models similar to a two-dimensional or three-dimensional image provide by a user.

In another aspect, the printer server 208 may periodically search for suitable content at remote locations on the data network, which content may be retrieved to the database 209, or have its remote location (e.g., a URL or other network location identifier) stored in the database 209. In another aspect, the print server 208 may provide an interface for submission of objects from remote users, along with any suitable metadata such as a title, tags, creator information, descriptive narrative, pictures, recommended printer settings, and so forth. In one aspect, the database 209 may be manually curated according to any desired standards. In another aspect, printable objects in the database 209 may be manually or automatically annotated according to content type, popularity, editorial commentary, and so forth.

The print server 208 may more generally provide a variety of management functions. For example, the print server 204 may store a location of a predetermined alternative three-dimensional printer to execute a print job from a remote user in the event of a failure by the one of the plurality of three-dimensional printers 204. In another aspect, the print server 208 may maintain exclusive control over at least one of the plurality of three-dimensional printers 204, such that other users and/or print servers cannot control the printer. In another aspect, the print server 208 may submit a print job to a first available one of the plurality of three-dimensional printers 204.

In another aspect, a print server 208 may provide an interface for managing subscriptions to sources of content. This may include tools for searching existing subscriptions, locating or specifying new sources, subscribing to sources of content, and so forth. In one aspect, a print server 208 may manage subscriptions and automatically direct new content from these subscriptions to a three-dimensional printer 204 according to any user-specified criteria. Thus while it is contemplated that a three-dimensional printer 204 may autonomously subscribe to sources of content through a network interface and receive new content directly from such sources, it is also contemplated that this feature may be maintained through a remote resource such as a print server 208.

A print server 208 may maintain print queues for participating three-dimensional printers 204. This approach may advantageously alleviate backlogs at individual printers 204, which may have limited memory capacity for pending print jobs. More generally, a print server 208 may, by communicating with multiple three-dimensional printers 204, obtain a view of utilization of multiple networked resources that permits a more efficient allocation of print jobs than would be possible through simple point-to-point communications among users and printers. Print queues may also be published by a print server 208 so that users can view pending queues for a variety of different three-dimensional printers 204 prior to selecting a resource for a print job. In one aspect, the print queue may be published as a number of print jobs and size of print jobs so that a requester can evaluate likely delays. In another aspect, the print queue may be published as an estimated time until a newly submitted print job can be initiated.

In one aspect, the print queue of one of the print servers 208 may include one or more print jobs for one of the plurality of three-dimensional printers 204. The print queue may be stored locally at the one of the plurality of three-dimensional printers. In another aspect, the print queue may be allocated between the database 209 and a local memory of the three-dimensional printer 204. In another aspect, the print queue may be stored, for example, in the database 209 of the print server 208. As used here, the term 'print queue' is intended to include print data (e.g., the three-dimensional model or tool instructions to fabricate an object) for a number of print job (which may be arranged for presentation in order of expected execution), as well as any metadata concerning print jobs. Thus, a portion of the print queue such as the metadata (e.g., size, status, time to completion) may be usefully communicated to a print server 208 for sharing among users while another portion of the print queue such as the model data may be stored at a printer in preparation for execution of a print job.

Print queues may implement various user preferences on prioritization. For example, for a commercial enterprise, longer print jobs may be deferred for after normal hours of operation (e.g., after 5:00 p.m.), while shorter print jobs may be executed first if they can be completed before the end of a business day. In this manner, objects can be identified and fabricated from within the print queue in a manner that permits as many objects as possible to be fabricated before a predetermined closing time. Similarly, commercial providers of fabrication services may charge explicitly for prioritized fabrication, and implement this prioritization by prioritizing print queues in a corresponding fashion.

In another aspect, a print server 208 may provide a virtual workspace for a user. In this virtual workspace, a user may search local or remote databases of printable objects, save objects of interest (or links thereto), manage pending prints, specify preferences for receiving status updates (e.g., by electronic mail or SMS text), manage subscriptions to content, search for new subscription sources, and so forth. In one aspect, the virtual workspace may be, or may include, web-based design tools or a web-based design interface that permits a user to create and modify models. In one aspect, the virtual workspace may be deployed on the web, while permitting direct fabrication of a model developed within that environment on a user-specified one of the three-dimensional printers 204, thus enabling a web-based design environment that is directly coupled to one or more fabrication resources.

The content sources 210 may include any sources of content for fabrication with a three-dimensional printer 204. This may, for example, include databases of objects accessible through a web interface or application programming interface. This may also or instead include individual desktop computers or the like configured as a server for hosted access, or configured to operate as a peer in a peer-to-peer network. This may also or instead include content subscription services, which may be made available in an unrestricted fashion, or may be made available on a paid subscription basis, or on an authenticated basis based upon some other relationship (e.g., purchase of a related product or a ticket to an event). It will be readily appreciated that any number of content providers may serve as content sources 210 as contemplated herein. By way of non-limiting example, the content sources 210 may include destinations such as amusement parks, museums, theaters, performance venues, or the like, any of which may provide content related to users who purchase tickets. The content sources 210 may include manufacturers such as automobile, computer, consumer electronics, or home appliance manufacturers, any of which may provide content related to upgrades, maintenance, repair, or other support of existing products that have been purchased. The content sources 210 may include artists or other creative enterprises that sell various works of interest. The content sources 210 may include engineering or architectural firms that provide marketing or advertising pieces to existing or prospective customers. The content sources 210 may include marketing or advertising firms that provide promotional items for clients. More generally, the content sources 210 may be any individual or enterprise that provides single or serial objects for fabrication by the three-dimensional printers 204 described herein.

One or more web servers 211 may provide web-based access to and from any of the other participants in the environment 200. While depicted as a separate network entity, it will be readily appreciated that a web server 211 may be logically or physically associated with one of the other devices described herein, and may, for example, provide a user interface for web access to one of the three-dimensional printers 204, one of the print servers 208 (or databases 209 coupled thereto), one of the content sources 210, or any of the other resources 216 described below in a manner that permits user interaction through the data network 202, e.g., from a client device 206 or mobile device 212.

The mobile devices 212 may be any form of mobile device, such as any wireless, battery-powered device, that might be used to interact with the networked printing environment 200. The mobile devices 212 may, for example, include laptop computers, tablets, thin client network computers, portable digital assistants, messaging devices, cellular phones, smart phones, portable media or entertainment devices, and so forth. In general, mobile devices 212 may be operated by users for a variety of user-oriented functions such as to locate printable objects, to submit objects for printing, to monitor a personally owned printer, and/or to monitor a pending print job. A mobile device 212 may include location awareness technology such as Global Positioning System ("GPS"), which may obtain information that can be usefully integrated into a printing operation in a variety of ways. For example, a user may select an object for printing and submit a model of the object to a print server, such as any of the print servers described above. The print server may determine a location of the mobile device 212 initiating the print job and locate a closest printer for fabrication of the object.

In another aspect, a printing function may be location-based, using the GPS input (or cellular network triangulation, proximity detection, or any other suitable location detection techniques). For example, a user may be authorized to print a model only when the user is near a location (e.g., within a geo-fenced area or otherwise proximal to a location), or only after a user has visited a location. Thus a user may be provided with printable content based upon locations that the user has visited, or while within a certain venue such as an amusement park, museum, theater, sports arena, hotel, or the like. Similarly, a matrix barcode such as a QR code may be employed for localization.

The other resources 216 may include any other software or hardware resources that may be usefully employed in networked printing applications as contemplated herein. For example, the other resources 216 may include payment processing servers or platforms used to authorize payment for content subscriptions, content purchases, or printing resources. As another example, the other resources 216 may include social networking platforms that may be used, e.g., to share three-dimensional models and/or fabrication results according to a user's social graph. In another aspect, the other resources 216 may include certificate servers or other security resources for third party verification of identity, encryption or decryption of three-dimensional models, and so forth. In another aspect, the other resources 216 may include online tools for three-dimensional design or modeling, as well as databases of objects, surface textures, build supplies, and so forth. In another aspect, the other resources 216 may include a desktop computer or the like co-located (e.g., on the same local area network with, or directly coupled to through a serial or USB cable) with one of the three-dimensional printers 204. In this case, the other resource 216 may provide supplemental functions for the three-dimensional printer 204 in a networked printing context such as maintaining a print queue or operating a web server for remote interaction with the three-dimensional printer 204. Other resources 216 also include supplemental resources such as three-dimensional scanners, cameras, and post-processing/finishing machines or resources. More generally, any resource that might be usefully integrated into a networked printing environment may be one of the resources 216 as contemplated herein.

It will be readily appreciated that the various components of the networked printing environment 200 described above may be arranged and configured to support networked printing in a variety of ways. For example, in one aspect there is disclosed herein a networked computer with a print server and a web interface to support networked three-dimensional printing. This device may include a print server, a database, and a web server as discussed above. The print server may be coupled through a data network to a plurality of three-dimensional printers and configured to receive status information from one or more sensors for each one of the plurality of three-dimensional printers. The print server may be further configured to manage a print queue for each one of the plurality of three-dimensional printers. The database may be coupled in a communicating relationship with the print server and configured to store print queue data and status information for each one of the plurality of three-dimensional printers. The web server may be configured to provide a user interface over the data network to a remote user, the user interface adapted to present the status information and the print queue data for one or more of the plurality of three-dimensional printers to the user and the user interface adapted to receive a print job from the remote user for one of the plurality of three-dimensional printers.

The three-dimensional printer 204 described above may be configured to autonomously subscribe to syndicated content sources and periodically receive and print objects from those sources. Thus in one aspect there is disclosed herein a device including any of the three-dimensional printers described above; a network interface; and a processor (which may without limitation include the controller for the printer). The processor may be configured to subscribe to a plurality of sources of content (such as the content sources 210 described above) selected by a user for fabrication by the three-dimensional printer through the network interface. The processor may be further configured to receive one or more three-dimensional models from the plurality of content sources 210 and to select one of the one or more three-dimensional models for fabrication by the three-dimensional printer 204 according to a user preference for prioritization. The user preference may, for example, preferentially prioritize particular content sources 210, or particular types of content (e.g., tools, games, artwork, upgrade parts, or content related to a particular interest of the user).

The memory of a three-dimensional printer 204 may be configured to store a queue of one or more additional three-dimensional models not selected for immediate fabrication. The processor may be programmed to periodically re-order or otherwise alter the queue according to pre-determined criteria or manual user input. For example, the processor may be configured to evaluate a new three-dimensional model based upon a user preference for prioritization, and to place the new three-dimensional model at a corresponding position in the queue. The processor may also or instead be configured to retrieve content from one of the content sources 210 by providing authorization credentials for the user, which may be stored at the three-dimensional printer or otherwise accessible for presentation to the content source 210. The processor may be configured to retrieve content from at least one of the plurality of content sources 210 by authorizing a payment from the user to a content provider. The processor may be configured to search a second group of sources of content (such as any of the content sources 210 described above) according to one or more search criteria provide by a user. This may also or instead include demographic information for the user, contextual information for the user, or any other implicit or explicit user information.

In another aspect, there is disclosed herein a system for managing subscriptions to three-dimensional content sources such as any of the content sources 210 described above. The system may include a web server configured to provide a user interface over a data network, which user interface is adapted to receive user preferences from a user including a subscription to a plurality of sources of a plurality of three-dimensional models, a prioritization of content from the plurality of sources, and an identification of one or more fabrication resources coupled to the data network and suitable for fabricating objects from the plurality of three-dimensional models. The system may also include a database to store the user preferences, and to receive and store the plurality of three-dimensional models as they are issued by the plurality of sources. The system may include a processor (e.g., of a print server 208, or alternatively of a client device 206 interacting with the print server 208) configured to select one of the plurality of three-dimensional models for fabrication based upon the prioritization. The system may include a print server configured to communicate with the one or more fabrication resources through the data network, to determine an availability of the one or more fabrication resources, and to transmit the selected one of the plurality of three-dimensional models to one of the one or more fabrication resources.

In another aspect, there is disclosed herein a network of three-dimensional printing resources comprising a plurality of three-dimensional printers, each one of the plurality of three-dimensional printers including a network interface; a server configured to manage execution of a plurality of print jobs by the plurality of three-dimensional printers; and a data network that couples the server and the plurality of three-dimensional printers in a communicating relationship.

In general as described above, the server may include a web-based user interface configured for a user to submit a new print job to the server and to monitor progress of the new print job. The web-based user interface may permit video monitoring of each one of the plurality of three-dimensional printers, or otherwise provide information useful to a remote user including image-based, simulation-based, textual-based or other information concerning status of a current print. The web-based user interface may include voice input and/or output for network-based voice control of a printer.

The fabrication resources may, for example, include any of the three-dimensional printers 204 described above. One or more of the fabrication resources may be a private fabrication resource secured with a credential-based access system. The user may provide, as a user preference and prior to use of the private fabrication resource, credentials for accessing the private fabrication resource. In another aspect, the one or more fabrication resources may include a commercial fabrication resource. In this case the user may provide an authorization to pay for use of the commercial fabrication resource in the form of a user preference prior to use of the commercial fabrication resource.

Many current three-dimensional printers require significant manufacturing time to fabricate an object. At the same time, certain printers may include a tool or system to enable multiple, sequential object prints without human supervision or intervention, such as a conveyor belt. In this context, prioritizing content may be particularly important to prevent crowding out of limited fabrication resources with low priority content that arrives periodically for autonomous fabrication. As a significant advantage, the systems and methods described herein permit prioritization using a variety of user-specified criteria, and permit use of multiple fabrication resources in appropriate circumstances. Thus prioritizing content as contemplated herein may include any useful form of prioritization. For example, this may include prioritizing the content according to source. The content sources 210 may have an explicit type that specifies the nature of the source (e.g., commercial or paid content, promotional content, product support content, non-commercial) or the type of content provided (e.g., automotive, consumer electronics, radio control hobbyist, contest prizes, and so forth). Prioritizing content may include prioritizing the content according to this type. The three-dimensional models themselves may also or instead include a type (e.g., tool, game, home, art, jewelry, replacement part, upgrade part, etc.) or any other metadata, and prioritizing the content may include prioritizing the content according to this type and/or metadata.

In one aspect, the processor may be configured to select two or more of the plurality of three-dimensional models for concurrent fabrication by two or more of the plurality of fabrication resources based upon the prioritization when a priority of the two or more of the plurality of three-dimensional models exceeds a predetermined threshold. That is, where particular models individually have a priority above the predetermined threshold, multiple fabrication resources may be located and employed to fabricate these models concurrently. The predetermined threshold may be evaluated for each model individually, or for all of the models collectively such as on an aggregate or average basis.

In one aspect, the processor may be configured to adjust prioritization based upon a history of fabrication when a number of objects fabricated from one of the plurality of sources exceeds a predetermined threshold. Thus, for example, a user may limit the number of objects fabricated from a particular source, giving subsequent priority to content from other sources regardless of an objectively determined priority for a new object from the particular source. This prevents a single source from overwhelming a single fabrication resource, such as a personal three-dimensional printer operated by the user, in a manner that crowds out other content from other sources of possible interest. At the same time, this may enable content sources 210 to publish on any convenient schedule, without regard to whether and how subscribers will be able to fabricate objects.

In another aspect, the processor may be configured to identify one or more additional sources of content based upon a similarity to one of the plurality of sources of content. For example, where a content source 210 is an automotive manufacturer, the processor may perform a search for other automotive manufactures, related parts suppliers, mechanics, and so forth. The processor may also or instead be configured to identify one or more additional sources of content based upon a social graph of the user. This may, for example, include analyzing a social graph of relationships from the user to identify groups with common interests, shared professions, a shared history of schools or places of employment, or a common current or previous residence location, any of which may be used to locate other sources of content that may be of interest to the user.

Figure 3:
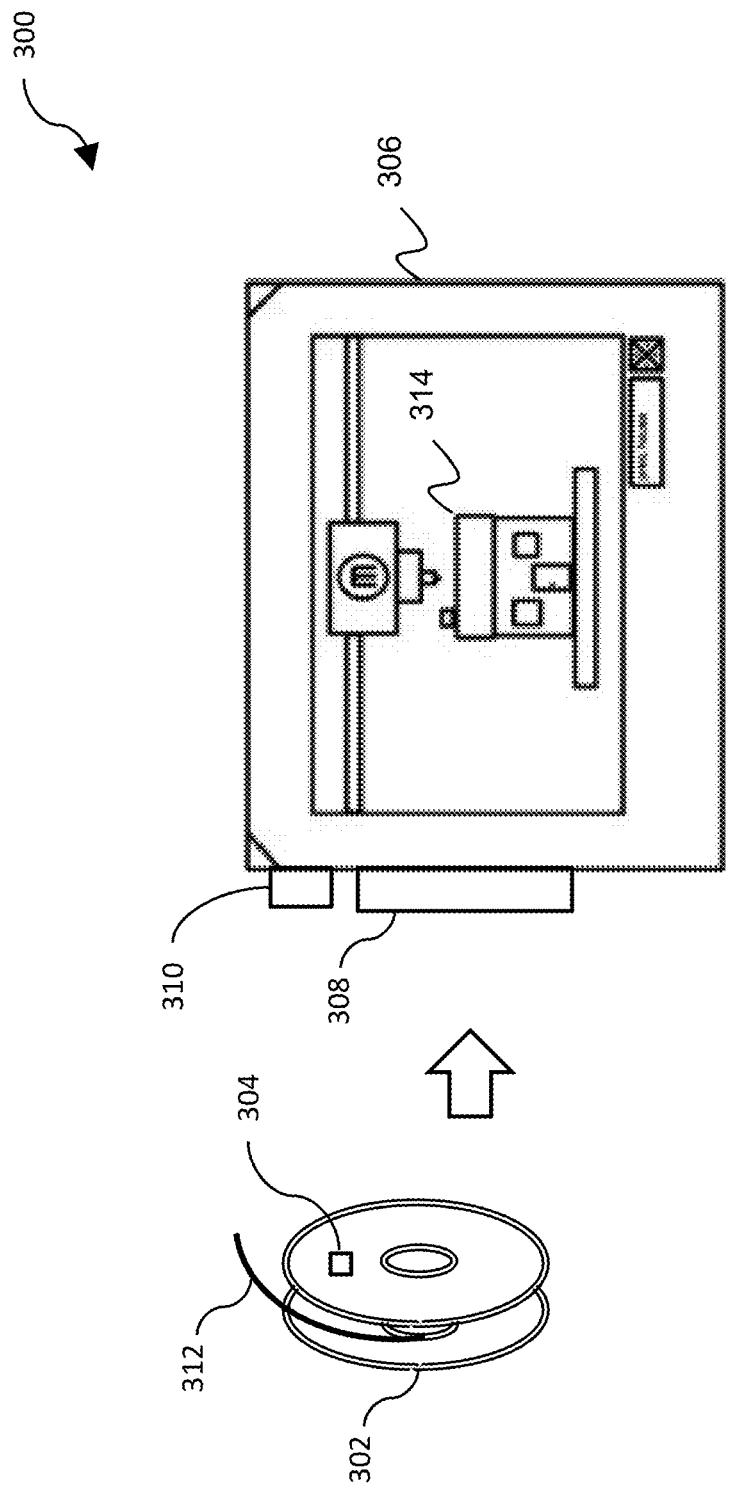
FIG. 3 is a block diagram of a three-dimensional printer and a supply of build material being connected through a coupling.

FIG. 3 is a block diagram of a three-dimensional printer system 300 that includes a three-dimensional printer 306 and a supply 302 of build material 312. The three-dimensional printer 306 may, for example, be any of the three-dimensional printers described herein, and may include a network interface and other hardware and software to couple the three-dimensional printer 306 in a communicating relationship with a data network as generally contemplated herein, and more specifically to retrieve data from remote resources concerning build materials detected using tags and tag readers.

The supply 302 may be adapted to be coupled to the three-dimensional print using a coupling 308. For example, the supply 302 may include a spool of filament, and the coupling 308 may be a spindle or the like on the three-dimensional printer 306 to receive the spool in a manner that permits the spool to rotate and deliver the filament. In another aspect, the supply 302 may include a cartridge of any size and shape suitable for containing build material, with the coupling 308 including a corresponding cartridge receptacle on the three-dimensional printer 306. The supply 302 may include any suitable container for build material 312, such as a spool of build material, a cartridge of filament, or a container of bulk material such as pellets, or a container of liquid, as well as combinations of these for a multi-modal printer. For example, the build material 312 may include at least one of acrylonitrile butadiene styrene (ABS), high-density polyethylene (HDPL), polylactic acid (PLA), a photocurable polymer, or other suitable build material 312. More generally, any build material 312 suitable for a corresponding three-dimensional printer 306 in any suitable container or format may be used as the supply 302.

The supply 302 may include a data tag 304 that stores data providing information on characteristics of the build material 312. Once the supply 302 is coupled to the three-dimensional printer 306, the data tag 304 may be automatically read by a tag sensor 310 on the three-dimensional printer 306.

The data tag 304 may be any device or combination of devices suitable for storing data relating to the build material 312. This may, for example, include a radio frequency identification (RFID) tag such as an active or passive RFID tag, an optically-identifiable tag such as a bar code, quick read (QR) code, or the like, a magnetically-identifiable tag such as a magnetic swipe strip, or any other tag that can be automatically detected and correlated by the controller 110 to identify information for the build material 312 in the supply 302. The tag 304 may also or instead include a number of mechanical features that encode information in a manner that can be detected by corresponding sensors (e.g., contact switches or the like) when the supply 302 is coupled to the printer 306. The mechanical features may include a plurality of recesses or protrusions encoding information about the build material 312. As with the other tag sensors 310 described above, a tag sensor 310 that mechanically reads data from the supply 302 may automatically identify the supply 302 and provide data concerning a type of build material and the like to a controller.

The tag sensor 310 may be communicatively associated with the three-dimensional printer 306 and the tag sensor 310 may be configured to automatically read data from the data tag 304 regarding the supply 302 of build material 312. The data may characterize at least one property of the build material 312. For example, characteristic data stored on the data tag 304 may include at least one of a material identification number, a build material type, a build material diameter, an extruder temperature requirement, a build material melting temperature, a build material color, a build material color lot number, a cost per unit of build material, a build material density, a build material tensile strength, a build material viscosity, a build material recycle code, a build material expiration date, or other characteristic information appropriate for a three-dimensional printer. In another aspect, the data tag 304 may encode a unique identifier for the supply 302, which can be used by the three-dimensional printer 306, e.g., in combination with a remote network resource, to determine properties of the build material 312 from which to further determine operational parameters for a fabrication process using the build material 312.

Once the supply 302 has been coupled to the coupling 308 and the tag sensor 310 has read the data tag 304 data, the data may be transmitted to the controller, which may be any of the controllers described herein, to determine at least one operational parameter for the three-dimensional printer 306 based on at least one characteristic of the build material 312 for the fabrication of an object 314. For example, the operational parameter may be at least one of an extruder temperature, a feed rate, a build platform temperature, a build volume temperature, an infill requirement, a rafting requirement, a support structure requirement, a cooling requirement, or other operational parameter that might usefully be determined by the controller from the data stored by the data tag 304.

In one embodiment, the controller may make the determination of operational parameters using only the data from the data tag 304. For example, the data tag 304 may explicitly specify an extruder temperature and the controller may use the extruder temperature as an operational parameter, or the data tag 304 may identify a type of build material and the controller may calculate a suitable extruder temperature based on the type. Similarly, the controller may calculate other operational parameters such as build platform temperature, feed rate, cooling parameters, build chamber heating parameters, and so forth.

In another embodiment, the controller may include, or have access to, a data store that includes data related to a build material identification number stored on the data tag 304. In this embodiment, the controller may make the determination of operational parameters using the material identification number stored on the data tag 304, such as by using the material identification number as a key to look up corresponding operational parameters (or information from which operational parameters can be determined) in the data store.

As should be appreciated, the controller may use any combination of data from the data tag 304 and a local or remote data store to determine the operational parameters. For example, the controller may receive the data provided by the data tag 304, lookup additional data within the data store, and combine the two sets of data to determine the operational parameters of the three-dimensional printer 306.

In another aspect, the determination of operational parameters may include preliminary diagnostic tests such as whether the diameter of the build material, size of a build material pellet, build material fluid viscosity, or the like is appropriate for the three-dimensional printer 306. Additional diagnostic test may be performed such as whether the correct build material 312 is provided on the supply 302, whether the correct color or color lot build material 312 is on the supply, or any other appropriate preliminary diagnostic build material test used to determine, as a threshold matter, whether a desired fabrication can be performed with the supply 302.

In another aspect, the tag sensor 310 may be configured to read an authentication code from the data tag 304 and the controller may be configured to conditionally build with the supply 302 of build material 312 only when the authentication code can be authenticated by the controller. This form of authentication can provide a digital rights management system for three-dimensional printers and build materials by ensuring that only authorized materials are used with suitably equipped three-dimensional printers. A variety of cryptographic techniques are known in the art for this type of authentication, any of which may be suitably employed to ensure that a proper authorization protocol is followed. This may, for example, include processing circuitry within the data tag 304 along with processing circuitry in the three-dimensional printer 306, to authenticate the supply 302 in any suitable manner. This process may also cooperate with a remote resource such as a private or third party key management system to provide any desired level of trust in the authentication process. This approach may generally facilitate quality control for suppliers of build material and greater consistency in results obtained by end users.

In one aspect, an authentication code may be mechanically encoded into a spool or other container in a manner that keys the container so that it cannot be fitted to an incorrect three-dimensional printer, or in a manner that can be interpreted by the printer so that the printer will not print in the absence of a suitable authentication code.

As described in FIG. 2, the three-dimensional printer 306 may be included in the networked three-dimensional printing environment 200. In an embodiment, as part of the networked environment 200, the three-dimensional printer system 300 may print an object 314 for a remote client device 206 using the network remote sources. In this embodiment, the determination of operational parameters may be performed by the client device 206 or one of the other remote sources such as a printer server 208, content source 210, web server 211, or other resource 216. The three-dimensional printer 306 may transmit the data tag 304 data to one of the remote sources configured for determination of the operational parameters and the appropriate remote source may transmit the determined operational parameters back to the three-dimensional printer 306 for fabrication of the object 314.

As a non-limiting example, a remote client device 206 may request an object 314 be printed on the network connected three-dimensional printer 306. The three-dimensional printer 306 may have one or more supplies 302, containing build material 312, connected to one or more couplings 308. The client device 206 may request the three-dimensional printer 306 to transmit the data tag 304 data for one or more of the connected supplies 302 for the determination of operational parameters for at least one of the connected supplies 302. The client device 206 may select which of the one or more supplies 302 to use in fabricating the object 314, determine the operational parameters for the selected supply 302, and transmit the operational parameters back to the three-dimensional printer 306 for fabrication of the object 314.

As another non-limiting example, the three-dimensional printer 306 may be configured to use other network entities to determine the operational parameters for the fabrication of the object 314. If a print job is received, the three-dimensional printer 306 may transmit the data tag 304 data for all of the connected supplies 302 to one or more of the remote sources for determination of operational parameters for the connected supplies. The one or more remote source may determine the operational parameters for the connected supplies 302 and transmit the operational parameters back to the three-dimensional printer 306. The operational parameters may then be combined with the three-dimensional printer 306 print job information for the fabrication of the object 314. In another aspect, a print server 208 may request build material information from one or more supplies coupled to a three-dimensional printer, and may store this information and make this information available to users of the print server, or as an input to a process on the print server for allocating print requests to various three-dimensional printers. More generally, data available from data tags 304 on supplies 302 may be used within the networked three-dimensional printing environment 200 to facilitate the distribution and execution of print requests in any desired manner.

As should be appreciated, the communication between the three-dimensional printer 306 and the remote sources of the networked three-dimensional printing environment 200 for the determination of operational parameters may be completed using any combination of the three-dimensional printer 306 capabilities and network source capabilities. For example, the three-dimensional printer 306 may determine some or all of the operational parameters of the available supplies 302 or the remote sources may determine some or all of the operational parameters of the available supplies 302. The operational parameters determined by the three-dimensional printer 306 and the remote resource may be combined into a single set of operational parameters by either the three-dimensional printer 306 or the remote source.

Returning to FIG. 3, the data tag 304 may also or instead encode data to identify a recycling code or the like for the build material 312, and a corresponding recycling code or similar information may be incorporated into an object 314 fabricated from the build material 312, such as by creating a corresponding symbol in an object 314 to be fabricated or by automatically or manually fixing a corresponding symbol in a build platform onto which the object 314 is fabricated so that the symbol is imparted onto the object 314 during fabrication. Recycling codes may, for example, include Society of the Plastics Industry (SPI) resin identification codes (currently 1-7 and 9 or ABS) or any other suitable notations. Where multiple build materials are used in a single model, the multiple types, or a general indication (e.g., "mixed plastics") may also or instead be used. In one aspect, the three-dimensional printer may be configured to accept user instructions concerning whether and how to deploy recycling labeling.

In another aspect, the data tag 304 may encode ordering information, such as information on how to purchase replacement build material, or information including an identifier of a suitable replacement container (with build material). When a three-dimensional printer or a suitably instrumented container detects a depletion of build material, the data tag 304 may be referenced by the three-dimensional printer to automatically order a suitable replacement, or to generate an alert to a user to order replacement material. In the latter case, the alert to the user may automatically be annotated to identify a part number, build material type, or the like to assist the user in ordering a suitable replacement.

FIGS. 4A-4C depict embodiments of a build material supply 400 that include a supply (402, 408, 412), a data tag 304, and build material (404, 410, 414). In general, FIGS. 4A-4C show the data tag 304 at certain locations (i.e. the side of a spool or the front of a container), however, it should be appreciated that the data tag 304 may be placed on any surface of the supply (402, 408, 412) that allows the data tag 304 to be readable by the tag sensor 310. Additionally, FIGS. 4A-4C depict non-limiting examples of supply containers (402, 408, 412), and any container that may be adapted to connect to the three-dimensional printer 306 may be used to contain build material (404, 408, 412).

FIG. 4A depicts a container for a build material including a spool 402 that contains a filament build material 404 and a data tag 304. The coupling 308 may include a spindle, and the spool 402 may be rotatably coupled to the coupling 308 by the spindle. As the build material 404 is consumed, the spool my rotate on the spindle of the coupling 308. The spindle may include a key (not shown) that couples in a keyed manner to the spool in order to ensure proper orientation of the spool 402 to the three-dimensional printer 306 and the tag sensor 308, which may include axial orientation (i.e., so that the build material extends from the correct side of the spool) as well as rotational orientation (i.e., to orient a data tag 304 to a tag sensor 308 when the spool is placed for use). In an embodiment, as the spool 402 is coupled to the three-dimensional printer 308, the data tag 304 may be orientated with the tag sensor 308 in a manner that allows the reading of the data tag 304, and the tag sensor 308 may automatically read the data from the data tag 304. In another embodiment, after the spool 402 is coupled to the three-dimensional printer 306, spool 402 may rotate about the spindle until the data tag 304 is orientated with the tag sensor 308 allowing the data tag 304 to be read by the tag sensor 308.

It will be appreciated that a filament of build material may be provided in other forms than on a spool, such as in a box from which the filament freely exits, or a cartridge that mates with a receptacle on a three-dimensional printer. All such forms of packaging may serve as a container as contemplated herein provided they can accommodate a data tag 304 that can be reliably detected and interpreted by a tag sensor 308.

FIG. 4B depicts a container for a build material that includes a cartridge 408 that contains pelletized build material 410 and a data tag 304. While the cartridge 408 is shown with a viewing window, it should be appreciated that a viewing window is not a requirement of the cartridge 408 and that the cartridge 408 may incorporate one or more windows or no windows. The cartridge 408 may optionally include sensors and processing circuitry to actively provide data concerning an amount of build material in the cartridge 408, which processing circuitry may be locally powered by a battery or powered through an electronic coupling to a three-dimensional printer. The cartridge 408 may be coupled to the coupling 308 of the three-dimensional printer 306 in a manner allowing the pellets of build material 410 to be fed into three-dimensional printer for use in fabrication, e.g., by an extruder or other tool. As the cartridge 408 is coupled to the three-dimensional printer 308, the data tag 304 may be orientated with the tag sensor 308 in a manner that allows the reading of the data tag 304, and the tag sensor 308 may automatically read the data from the data tag 304.

It will be understood that the pellets of build material 410 may be any size or combination of sizes ranging from a fine powder to relatively large spheres or other shapes that can be melted and extruded. Similarly, the pellets may be of different colors, and the pellets may include different materials that may be mixed during a fabrication process to obtain desired aggregate properties in a fabricated object.

FIG. 4C depicts a container for a build material that includes a cartridge 412 containing a liquid build material 414 and a data tag 304. While the cartridge 412 is shown with a viewing window, it should be appreciated that a viewing window is not a requirement of the cartridge 412 and that the cartridge 412 may incorporate one or more windows or no windows. The cartridge 408 may optionally include sensors and processing circuitry to actively provide data concerning an amount of build material in the cartridge 408, which processing circuitry may be locally powered by a battery or powered through an electronic coupling to a three-dimensional printer. In an embodiment, the cartridge 412 may be coupled to the three-dimensional printer 306 coupling 308 in a manner allowing the liquid 414 to be fed into an extruder or other tool for use in fabrication. As the cartridge 412 is coupled to the three-dimensional printer 308, the data tag 304 may be orientated with the tag sensor 308 in a manner that allows the reading of the data tag 304, and the tag sensor 308 may automatically read the data from the data tag 304.

FIGS. 5A-5D depict embodiments of tag sensors and data tags. As may be appreciated, any of the data tags described in FIGS. 5A-5D may be incorporated into or attached to any of the supplies described in FIGS. 4A-4C.

FIG. 5A depicts an embodiment of an RFID data tag 502 and an RFID tag sensor 504. The RFID data tag 502 may be a passive RFID tag or an active RFID tag. As known by one with knowledge in the art, an active RFID tag includes a power source that provides power to the active RFID tag to broadcast a signal 508 that includes the data stored on the active RFID tag. A passive RFID tag does not include an internal power source and the passive RFID tag is powered by converting the RFID tag sensor 504 signal 506 into a voltage. As previously discussed, the RFID data tag 502 may be attached to the supply 302 in a position to allow the RFID data tag 502 to be read by the RFID tag sensor 504. The RFID tag sensor 504 may be incorporated into the tag sensor 310 in a position to read the RFID data tag 502. As a non-limiting example, as the supply 302 may be coupled to the three-dimensional printer 306 coupling 308, and the RFID tag sensor 504 may broadcast a signal 506 requesting data from the RFID data tag 502. When the RFID data tag 502 receives the RFID tag sensor 504 broadcast 506, the RFID data tag 1002 may broadcast 508 the requested data to the RFID tag sensor 504. Once all the data has been received by the RFID tag sensor 504, the RFID tag sensor 504 may transmit the data to the controller 110 as discussed above.

FIG. 5B depicts an embodiment of an optical tag sensor 510 reading an optically-identifiable tag (512, 514). The optically-identifiable tag (512, 514) may be a bar code 512, a QR code 514, or other optically-identifiable tag. As known by one with knowledge in the art, the optically-identifiable tag (512, 514) encodes data using lines or points arranged according to certain rules onto the optically-identifiable tag (512, 514). The optically-identifiable tag (512, 514) may be attached to the supply 302 in a position accessible to the optical tag sensor 510. The optical tag sensor 510 may be positioned to read the optically-identifiable tag (512, 514) in any suitable manner. For example, when the supply 302 is coupled to the three-dimensional printer 306 coupling 308, the optical tag sensor 510 may optically capture 516 features of the optically-identifiable tag (512, 514), and convert the optically captured features to data. It will also be understood that other optical detection techniques may be used, such as Optical Character Recognition or any other standardized or proprietary technique for encoding and reading data with optical sensors. Once the data has been converted by the optical tag sensor 510, the optical tag sensor 510 may transmit the data to the controller 110 as discussed above.

Figure 5C:
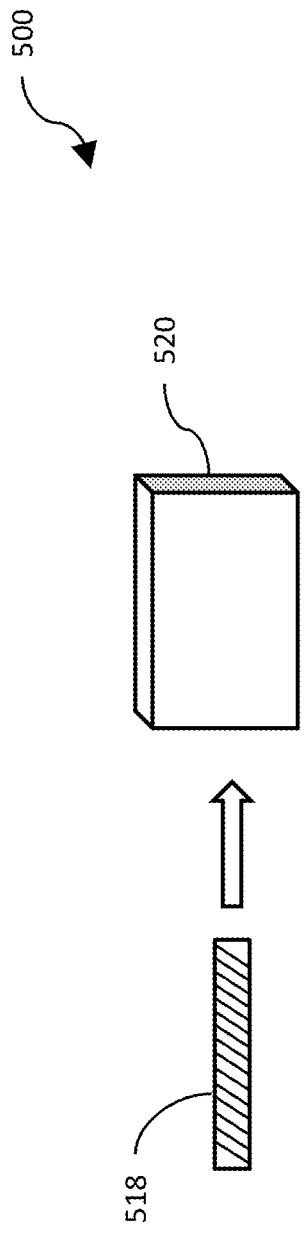

FIG. 5C depicts an embodiment of a magnetic tag sensor 520 reading a magnetically-identifiable tag 518. In an embodiment, the magnetically-identifiable tag 518 may be a magnetic swipe strip. As known to one with knowledge in the art, the magnetically-identifiable tag 518 includes data magnetically encoded into a magnetic strip which may be read as the magnetic strip is passed by a magnetic sensor. As previously discussed, the magnetically-identifiable tag 518 may be attached to the supply 302 in a position to allow the magnetically-identifiable tag 518 to be read by the magnetic tag sensor 520. The magnetic tag sensor 520 may be incorporated into the tag sensor 310 in a position to read the magnetically-identifiable tag 518. In a non-limiting example, as the supply 302 is coupled to the three-dimensional printer 306 coupling 308, the magnetic tag sensor 520 may read the magnetic data of the magnetically-identifiable tag 518. Once the data has been read by the magnetic tag sensor 520, the magnetic tag sensor 520 may transmit the data to the controller 110 as discussed above.

Figure 5D:
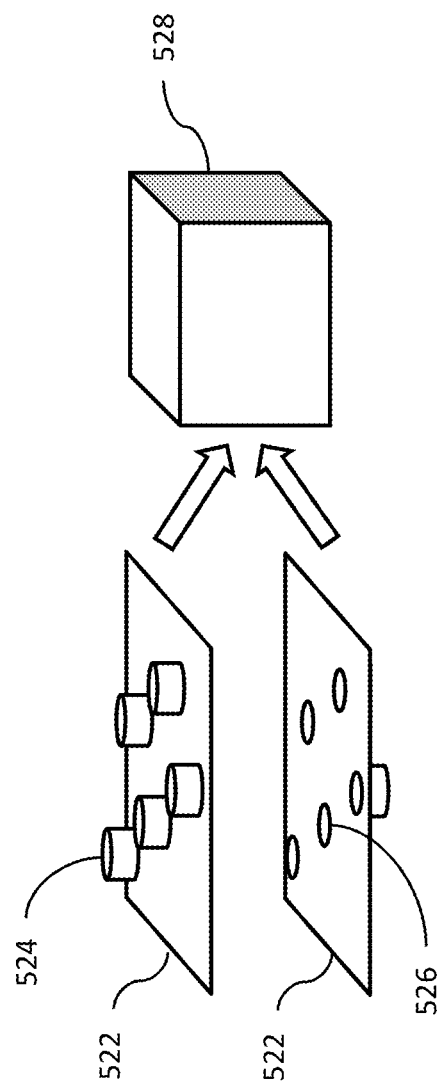

FIG. 5D depicts an embodiment of a mechanical tag sensor 528 reading a mechanical feature tag (524, 526). In an embodiment, a mechanical feature tag (524, 526) may include a plurality of protrusions 524, recesses 526, or other physical features on a container. While cylindrical features are depicted by way of illustration, it should be understood that the physical feature may be of any shape or size suitable for encoding data to be read by a mechanical tag sensor 528 including without limitation hemispheres, grooves, holes, notches, blocks, and the like. Additionally, the physical feature types may be intermixed on the same mechanical feature tag (524, 526). For example, a mechanical feature tag (524, 526) may include both protruding features and recessed features. In embodiments, the physical features may be incorporated onto a separate substrate 522 that is attached to the supply 302, or may be incorporated directly into or onto the supply 302. The mechanical feature sensor 528 may include switches, transducers, or other devices for reading protruding or recessed physical features.

In general, the mechanical features forming the mechanical feature tags 524, 526 may be formed into a spool or other container, and may include features of the container itself, which may be further adapted to include human-readable information or the like to facilitate manual review prior to coupling to a three-dimensional printer.

In embodiments, the mechanical feature tag 524, 526 may be read by the mechanical tag sensor 528 through physical contact such as by pressing into the mechanical tag sensor 528, passing through the mechanical tag sensor 528, passing over the mechanical tag sensor 528, passing under the mechanical tag sensor 528, or any other suitable technique. The mechanical feature tag (524, 526) may also or instead be detected using non-contact methods such as capacitance, optical analysis, and so forth. The mechanical feature tag (524, 526) may be attached to the supply 302 in a position to allow the mechanical feature tag (524, 526) to be read by the mechanical tag sensor 528. The mechanical tag sensor 528 may be incorporated into the tag sensor 310 in a position to read the mechanical feature tag (524, 526). In a non-limiting example, as the supply 302 is coupled to the three-dimensional printer 306 coupling 308, the mechanical tag sensor 528 may read the physical feature data of the mechanical feature tag (524, 526). Once the data has been read by the mechanical tag sensor 528, the mechanical tag sensor 528 may transmit the data to the controller 110 as discussed above.

FIG. 6 is a flowchart of a method for using a three-dimensional printer to read build material supply tag data and fabricate an object.

As shown in step 602, the method 600 may include providing a three-dimensional printer with a controller and a tag sensor. In one aspect, this may include providing a tag sensor as an add-on component to a three-dimensional printer and coupling the tag sensor to the controller for the three-dimensional printer. In another aspect, this may simply include providing a three-dimensional printer that is equipped with a suitable tag sensor.

As shown in step 604, the method 600 may include coupling a container with a data tag to the three-dimensional printer. The container may be any of the containers of build material described above, and the data tag may store information about the build material such as a property of the build material in the container. The data tag may be a radio frequency identification (RFID) tag, an optically-identifiable tag, a magnetically-identifiable tag, or a mechanically encoded feature of the container.

Types of data that may be usefully stored by the data tag are described above. Without limiting the generality of the foregoing, the data may include information about mechanical or structural properties of the build material, thermal properties of the build material (including phase change data), aesthetic properties of the build material, or any other properties useful for determining operational parameters. Other data that is not necessarily specifically tied to operational parameters may also be included, such as an amount of material in the container (which may be an initial amount when shipped, or a measured amount using active circuitry as described above), an expiration date, a brand name, and so forth, as well as data indirectly related to build material properties such as a unique identifier for the build material or the container. By way of non-limiting examples, the property characteristic encoded on the data tag may include a material identification number, a type of the build material, a diameter of the build material, an extruder temperature requirement, a melting temperature of the build material, a color of the build material, a lot number of the build material, a unit cost of the build material, a density of the build material, a tensile strength of the build material, a viscosity of the build material, a recycling category or code for the build material, and an expiration date for the build material.

As shown in step 606, the method 600 may include reading data from the data tag using the tag sensor of the three-dimensional printer. As described above, the data may be read by an RFID sensor, optical sensor, magnetic sensor, or mechanical sensor.

As shown in step 608, the method 600 may include transmitting the data from tag sensor to the controller. As discussed above, the controller may be associated with the local three-dimensional printer printing the object, or the controller may be associated with a remote resource within a networked three-dimensional printing environment.

As shown in step 610, the method 600 may include determining an operational parameter for the fabrication of an object by the three-dimensional printer based on data from the data tag. More specifically information about the build material stored in the data tag may be used to determine how the build material should be used in a fabrication process. For example, based upon the type of build material, the controller may determine a variety of parameters such as an extruder temperature, a feed rate, a build platform temperature, a build volume temperature, an infill requirement, a rafting requirement, a support structure requirement, an extruder movement speed, and a cooling requirement. More generally, any parameter that can be controlled by the three-dimensional printer might usefully be determined with reference to the type of material and/or other information available on the data tag.

In one aspect where the data tag and reader implement a rights management protocol for build material, the operational parameter may be an authorization to print. Thus for example, the reader may read an authentication code which may be transmitted to a controller and used to authenticate the build material for the printer. It will be understood that a variety of cryptographic techniques may be suitably employed to implement rights management for build material. For example, the container may have a private key that is used to sign a message from the controller, with the corresponding signed message confirmed by a remote resource. More generally, any suitable protocol may be usefully employed with varying degrees of security and trust, including without limitation techniques ranging from a direct reading of a static code encoded on a data tag to public key management infrastructures (either implemented directly or through a trusted third party) to multi-factor security techniques including security cards or equivalents (e.g., for the container, printer, and/or user of the printer), passwords or other credentials, biometric identification (e.g., voice identification, fingerprint detection, facial recognition, etc.), and so forth.

As shown in step 612, the method 600 may include fabricating an object while using the operational parameter (s) to control operation of a three-dimensional printer. It will be appreciated that this approach can dramatically simplify use of a three-dimensional printer by automating those aspects of printer configuration that depend on the type of build material being used. Thus a user may simply load a build materially from a suitably instrumented container and select an object to print without specifying various configuration details that might otherwise be required. At the same time, a printer may simply select default operational parameters that a user can override if further customization of a fabrication process is desired.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method, comprising:
providing a three-dimensional printer that includes a controller and a tag sensor;
coupling a container of a build material to the three-dimensional printer, the container including a tag that stores at least one property of the build material and a private key to prevent use of an unauthorized build material with the three-dimensional printer;
transmitting a message from the controller to the tag;
signing the message at the tag with the private key to provide a signed message and returning the signed message to the controller;
transmitting the signed message from the controller to a resource for authentication;
when the signed message cannot be authenticated by the resource, preventing fabrication with the build material on the three-dimensional printer; and
when the signed message is authenticated:
determining an operational parameter with the controller for configuring the three-dimensional printer for a fabrication process using the build material based upon at least one property of the build material from the tag; and
fabricating an object with the three-dimensional printer based upon the operational parameter.

2. The method of claim 1 wherein the resource includes a third-party key management system.

3. The method of claim 1 wherein the resource is a remote resource managed by a third party.

4. The method of claim 1 wherein the tag includes at least one of a radio frequency identification (RFID) tag, an optically-identifiable tag, a magnetically-identifiable tag, and a mechanical feature of the container.

5. The method of claim 1 wherein the tag further comprises data including at least one of a material identification number, a build material type, a build material diameter, an extruder temperature requirement, a build material melting temperature, a build material color, a build material color lot number, a cost per unit of build material, a build material density, a build material tensile strength, a build material viscosity, a build material recycle code, and a build material expiration date.

6. The method of claim 1 wherein the operational parameter includes at least one of an extruder temperature, a feed rate, a build platform temperature, a build volume temperature, an infill requirement, a rafting requirement, a support structure requirement, and a cooling requirement.

7. The method of claim 1 wherein the container includes at least one of a cartridge and a spool.

8. The method of claim 1 wherein the build material includes at least one of a filament, a number of pellets, and a liquid.

9. The method of claim 1 wherein the build material includes at least one of acrylonitrile butadiene styrene (ABS), high-density polyethylene (HDPL), and polylactic acid (PLA).

10. The method of claim 1 wherein the tag includes a radio frequency identification (RFID) tag, and the RFID tag is at least one of a passive RFID tag and an active RFID tag.

11. The method of claim 1 wherein the tag includes an optically-identifiable tag, and the optically-identifiable tag is at least one of bar code and quick read (QR) code.

12. The method of claim 1 wherein the tag includes a magnetically-identifiable tag, and the magnetically-identifiable tag is a magnetic swipe strip.

13. The method of claim 1 wherein the tag includes a mechanical feature of the container, and the mechanical feature includes a plurality of recesses or protrusions encoding information about the build material.

14. The method of claim 1 wherein the tag sensor includes at least one of a radio frequency identification (RFID) reader, an optical scanner, a magnetic reader, and a contact point sensor.

15. The method of claim 1 wherein determining the operational parameter is based upon a build material identification number contained in data included in the tag.

* * * * *